(12) United States Patent
Houmeau et al.

(10) Patent No.: US 7,940,329 B2
(45) Date of Patent: *May 10, 2011

(54) METHOD AND SYSTEM FOR SYNCHRONIZING COLORIMETRIC RENDERING OF A JUXTAPOSITION OF DISPLAY SURFACES UNIFORM

(76) Inventors: Francoise Houmeau, Paris (FR); Olivier Gachignard, Montrouge (FR); Alain Leyreloup, Issy les Moulineaux Cedex (FR)

(*) Notice: Subject to any disclaimer, the term of this patent is extended or adjusted under 35 U.S.C. 154(b) by 0 days.

This patent is subject to a terminal disclaimer.

(21) Appl. No.: 12/365,432

(22) Filed: Feb. 4, 2009

(65) Prior Publication Data

US 2009/0174780 A1 Jul. 9, 2009

Related U.S. Application Data

(63) Continuation of application No. 10/505,987, filed as application No. PCT/FR03/00525 on Feb. 18, 2003, now Pat. No. 7,489,337.

(30) Foreign Application Priority Data

Mar. 7, 2002 (FR) .................................. 02 02911

(51) Int. Cl.
*H04N 17/00* (2006.01)
*H04N 5/66* (2006.01)
*H04N 9/73* (2006.01)
*H04N 3/22* (2006.01)
*H04N 3/26* (2006.01)
*H04N 17/02* (2006.01)
*G09G 5/00* (2006.01)

(52) U.S. Cl. ........ 348/383; 348/182; 348/745; 348/179; 348/189; 348/658; 345/1.3

(58) Field of Classification Search .................. 348/180, 348/182, 189, 52, 179, 658, 745; 345/1.3; 382/167
See application file for complete search history.

(56) References Cited

U.S. PATENT DOCUMENTS

| | | | |
|---|---|---|---|
| 5,541,641 | A | 7/1996 | Shimada |
| 5,883,476 | A | 3/1999 | Noguchi et al. |
| 6,020,868 | A | 2/2000 | Katyl et al. |
| 6,043,797 | A | 3/2000 | Gulick et al. |
| 6,219,011 | B1 | 4/2001 | Livni et al. |

(Continued)

FOREIGN PATENT DOCUMENTS

EP 0989757 3/2000

(Continued)

*Primary Examiner* — Brian Yenke
(74) *Attorney, Agent, or Firm* — Turocy & Watson, LLP

(57) ABSTRACT

A method for making uniform the colorimetric rendering of a display surface including several adjacent display screens (10a, 10b), comprising for each pair of adjacent screens (10a, 10b) steps of: periodically sampling (21) by a calculation device (5) image data in two corresponding screen (10a, 10b) areas (13a, 13b) in the pair of adjacent screens, analyzing (22, 23, 24) by the calculation device (5) image data sampled in each period to determine a difference in calorimetric rendering between the two screen areas, determining by a correction device (6) connected to the calculation device a process to be applied to the video stream to one of the two video systems controlling the two screens in the pair of adjacent screens, by applying a predetermined correction law to the difference in calorimetric rendering, and applying (26) by the correction device the process to said video system, in order to make the colorimetric rendering of the display surface uniform.

27 Claims, 2 Drawing Sheets

U.S. PATENT DOCUMENTS

| | | |
|---|---|---|
| 6,333,768 B1 | 12/2001 | Kawashima et al. |
| 6,340,976 B1 | 1/2002 | Oguchi et al. |
| 6,525,772 B2 | 2/2003 | Johnson et al. |
| 6,538,705 B1 | 3/2003 | Higurashi et al. |
| 6,558,006 B2 | 5/2003 | Ioka |
| 6,570,623 B1 | 5/2003 | Li et al. |
| 6,611,241 B1 | 8/2003 | Firester et al. |
| 6,717,625 B1 | 4/2004 | Thielemans |
| 6,814,448 B2 | 11/2004 | Ioka |
| 6,859,224 B2 | 2/2005 | Sugiura et al. |
| 6,864,894 B1 | 3/2005 | Lefebvre et al. |
| 6,864,921 B2 | 3/2005 | Kaneda et al. |
| 6,953,250 B2 | 10/2005 | Yasumi et al. |
| 7,002,606 B2 | 2/2006 | Tanaka et al. |
| 7,050,074 B1 | 5/2006 | Koyama |
| 7,051,287 B1 | 5/2006 | Tsunoda |
| 7,196,677 B2 | 3/2007 | Sato et al. |
| 7,227,593 B2 | 6/2007 | Lee et al. |
| 7,252,387 B2 | 8/2007 | Raskar et al. |
| 7,330,164 B2 | 2/2008 | George |
| 7,334,901 B2 | 2/2008 | El-Ghoroury |
| 7,475,181 B2 * | 1/2009 | Arai et al. ............ 710/305 |

FOREIGN PATENT DOCUMENTS

| | | |
|---|---|---|
| GB | 2327169 | 1/1999 |
| WO | 00/07376 | 2/2000 |
| WO | 02/07431 | 1/2002 |
| WO | 00/18139 | 3/2003 |

* cited by examiner

METHOD AND SYSTEM FOR SYNCHRONIZING COLORIMETRIC RENDERING OF A JUXTAPOSITION OF DISPLAY SURFACES UNIFORM

RELATED APPLICATIONS

This is a continuation of U.S. patent application Ser. No. 10/505,987 filed on Jan. 25, 2005 now U.S. Pat. No. 7,489,337, which is a U.S. national stage of International Patent Application No. PCT/FR03/00525, filed on Feb. 18, 2003, all of which are incorporated herein by reference.

This invention relates to the display of an image or a sequence of images on several adjacent display screens, each display screen being controlled by an independent video processing system.

It is applicable particularly, but not exclusively, to the display of images such as video images on a large screen composed of several adjacent and contiguous screens forming a screen wall. In such a system, each display unit is controlled by a separate video system so as to display a corresponding part of video images. Each display unit may be composed of an overhead display system, a video projection system, or a solid screen such as a cathode ray tube screen, or a plasma or liquid crystal screen.

In particular, it is applicable to videoconference systems putting two remote sites into two-directional audiovisual communication through a high speed transmission network, each remote site being equipped with what is called a "remote presence wall" composed of several adjacent and contiguous screens. In this type of system, each display unit is controlled by a separate video system connected to a camera installed on the other remote site.

The colorimetric rendering on each screen must be uniform from one screen to the other, so that the discontinuities in the images displayed by the different screens forming the "remote presence wall" due to the fact that they are displayed by different screens, are not visible.

BACKGROUND OF THE INVENTION

At the present time, the calorimetric setting of each display unit is done manually. It has been shown that this solution is not completely satisfactory, particularly due to the fact that the precision obtained by manual settings is not enough to eliminate all perceptible differences in the colorimetric rendering between two adjacent screens. Since the operator's eye is the only measurement instrument used, the evaluation of differences in calorimetric rendering remains very subjective.

Tools are available for observing and measuring display surfaces, such as calorimetric probes. However, this type of tool has never been combined with display unit adjustment systems or video processing systems.

Moreover, the operator remains dependent on the limits of the capacity to adjust the different video systems (no very large adjustment increment, adjustment inertia). All these limitations mean that manual adjustments are very approximate.

Moreover, regardless of the display technique used, the calorimetric rendering of a screen is subject to slow variations, particularly due to aging of some display unit or video system devices, which means that such adjustments have to be made regularly. Since these adjustments require a visit by an operator, it often happens that they are not carried out when they are necessary.

SUMMARY OF THE INVENTION

One embodiment of the invention is to eliminate these disadvantages, but without replacing manual adjustments that are still necessary to correct large differences in calorimetric rendering between adjacent screens.

This and other embodiments are attained in accordance with a method for making the calorimetric rendering of a display surface uniform, this surface including at least two adjacent display screens, controlled by video processing systems through which the corresponding video flows pass. According to the invention, this method comprises for each pair of adjacent screens in said display screens the steps of:

periodically sampling by a calculation device image data in two corresponding screen areas in the pair of adjacent screens, analyzing by the calculation device image data sampled in each period to determine a difference in calorimetric rendering between the two screen areas, determining by a correction device connected to the calculation device a process to be applied to the video stream to one of the two video systems controlling the two screens in the pair of adjacent screens, by applying a predetermined correction law to the difference in calorimetric rendering, and applying the process to said video system by the correction device, in order to make the calorimetric rendering of the display surface uniform.

Advantageously, the sampled image data are obtained using a camera placed overlapping the two screens on each pair of adjacent screens.

According to one specific embodiment of the invention, the analysis of sampled image data includes the steps of:

considering two measurement areas located symmetrically on each side of a separation line between the two screens in each pair of adjacent screens, in the sampled image data, determining color components in each measurement area, and determining differences in color components by comparing each average color component in one of the two measurement areas with the corresponding average color component in the other measurement area, the differences in color components forming the difference in calorimetric rendering.

Preferably, the average color components in each measurement area are determined from color components on each pixel in the measurement area.

Also preferably, image data are sampled at intervals of the order of a few minutes to a few tens of minutes.

According to another specific feature of the invention, the correction law applied by the correction device to the difference in calorimetric rendering is a matrix type law.

Alternatively, the correction law applied by the correction device to the difference in calorimetric rendering may be an iterative type law with a convergence criterion.

According to yet another specific feature, the method according to the invention includes a step of comparing the difference in calorimetric rendering with a predefined threshold, and if the difference in the calorimetric rendering is greater than the threshold, no correction process is applied to the video stream of either of the two video systems controlling the two screens in the pair of adjacent screens.

Advantageously, if the difference in calorimetric rendering is greater than the threshold for several consecutive periods, an alert signal is sent indicating that a manual adjustment of the video processing systems is necessary to make the calorimetric rendering of the display surface uniform.

According to yet another specific feature, the method according to the invention includes steps of storing a history of calorimetric differences determined for each pair of display screens, and making an analysis of the history to set up a calorimetric drifts law for each display screen.

Another embodiment of the invention is directed to a system for making the calorimetric rendering of a display surface uniform, this surface including at least two adjacent display screens, controlled by video processing systems through which the corresponding video streams pass. According to the embodiment, this system comprises a system for correction of the calorimetric rendering of the display screen by a separation area between two adjacent screens, each correction system including:

a sensor overlapping the separation area between the two screens, for supplying image data of images displayed on the two screens, a calculation device connected to the sensor and designed to periodically sample image data from among the image data supplied by the sensor, analyze the sampled image data, and deduce from said analysis a difference in calorimetric rendering between the two screens, a correction device connected to the calculation device and designed to determine a process to be applied to the video stream from one of the two video systems controlling the corresponding two screens, applying a predetermined correction law to the difference in calorimetric rendering, and to apply said process to the video stream in order to make the calorimetric rendering of the display surface uniform.

Advantageously, the sensor is a video camera.

BRIEF DESCRIPTION OF THE DRAWINGS

One preferred embodiment of the invention will be described below as a non-limitative example, with reference to the appended figures, wherein.

DETAILED DESCRIPTION OF THE DRAWINGS

Figure 1:
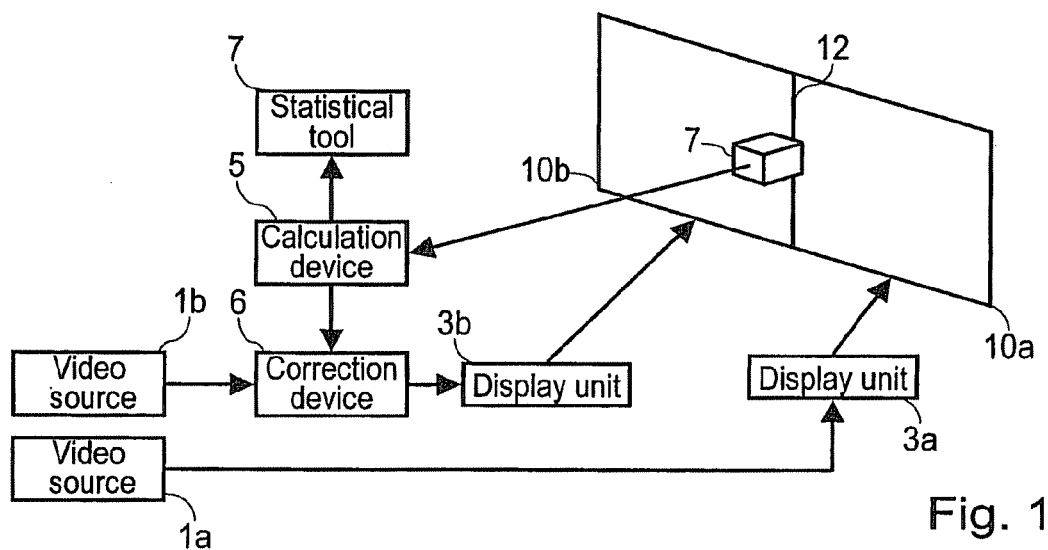
FIG. 1 shows a video image display system with two display units, equipped with the system according to the invention.

FIG. 1 shows a video image display system with two contiguous screens 10a, 10b.

This system includes two video systems each comprising a video image source 1a, 1b connected to a display unit 3a, 3b, each display unit controlling one of the display screens 10a, 10b. The assembly consisting of a display unit 3a, 3b and a display screen 10a, 10b actually represents an overhead projection system, a video projection system, or a solid screen such as a cathode ray tube screen, a plasma screen or a liquid crystal screen.

According to the invention, a sensor 7 is placed overlapping the separation area 12 between the two screens 10a, 10b, that transmits calorimetric measurements to a calculation device 5 designed to determine a difference in calorimetric rendering between the two screens 10a, 10b. The calculation device is connected to a correction device 6 inserted in one of the video systems and designed to correct color components of the video stream passing through the system as a function of the difference in calorimetric rendering determined by the calculation device 5. In the example illustrated in FIG. 1, the correction device 6 is placed between the video source 1b and the display unit 3b so as to modify color component parameters of the video stream from the source 1b, before applying them to the display unit 3b.

For example, the sensor 7 is composed of a video camera that transmits a video stream, or a periodic digital image, to the calculation device 5.

Figure 2:
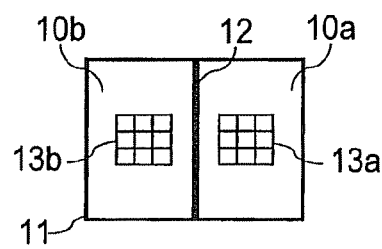
FIG. 2 shows an image taken by the sensor of the system shown in FIG. 1, for which the calorimetric rendering is analyzed in accordance with the method according to the invention.
Figure 3:
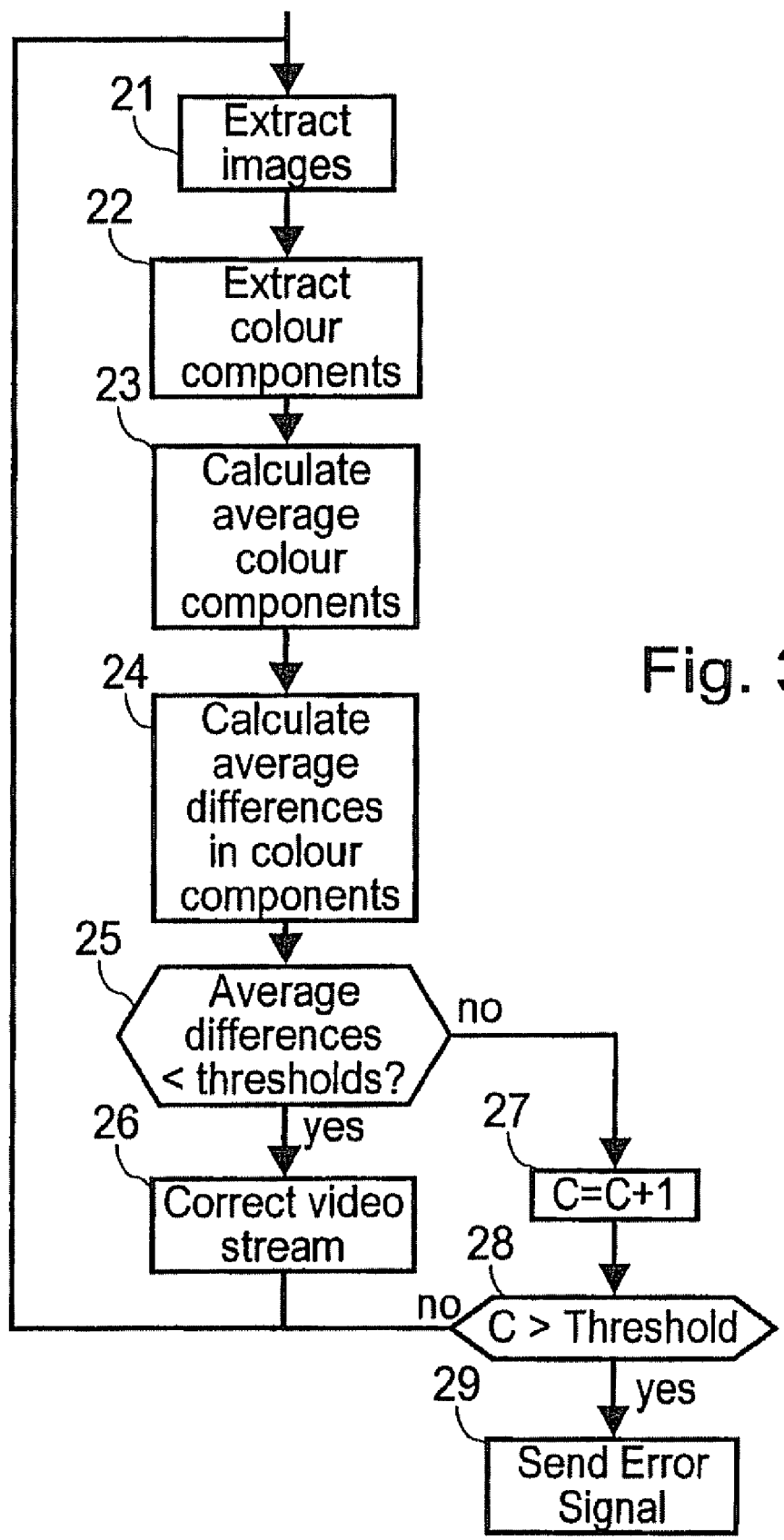
FIG. 3 illustrates the method according to the invention in the form of a flow chart.

In accordance with the method according to the invention illustrated in FIG. 3, the calculation device 5 samples 21 one or several images 11 of the video stream at regular intervals. Such an image is illustrated in FIG. 2. Each of these images represents part of the separation zone between the two contiguous screens 10a, 10b, and part of the images displayed by these two screens.

The calculation device analyses sampled images considering two measurement areas 13a, 13b distributed symmetrically on each side of the separation area 12 between the two screens. For example, the two measurement areas 13a, 13b may be squares with p×p pixels, and 3×3 pixels in the example shown in FIG. 2.

Since the calorimetric drift of display units is generally a relatively slowly changing phenomenon, there is no need to carry out the processing done by the calculation device 5 continuously. A corrective processing done at intervals of between a few minutes and a few tens of minutes is sufficient.

The analysis performed by the calculation device 5 consists of determining 22 the corresponding values of the R (red), G (green) and B (blue) components for each pixel in each area 13a, 13b, according to the units used in the computer domain. These values may for example be determined in the form of binary values on 8 bits.

The values of the color components thus determined are then weighted and averaged 23 on all pixels in each area 13a, 13b to obtain global color components $Ca_R$, $Ca_G$, $Ca_B$ and $Cb_R$, $Cb_G$, $Cb_B$ for each of these areas. The calculation device may also calculate an average of these values on several sampled images.

The global components $Ca_R$, $Ca_G$, $Ca_B$ and $Cb_R$, $Cb_G$, $Cb_B$ obtained for each zone 13a and 13b are then compared 24 in pairs to determine a calorimetric difference between the two screens, this difference consisting of a difference value for each color component. For example, this difference may be in the form $(\Delta C_R, \Delta C_G, \Delta C_B) = (Cb_R - Ca_R, Ca_G - Cb_G, Ca_B - Cb_B)$.

The value of this calorimetric difference is transmitted to the correction device 6 that uses a correction law $f(\Delta C_R, \Delta C_G, \Delta C_B)$ to deduce 26 the correction processing to be applied to the video stream to be corrected, in other words the video stream output from the source 1b in the example in FIG. 1, and then applies this processing.

The correction law $f(\Delta C_R, \Delta C_G, \Delta C_B)$ may be of the matrix or iterative type using a convergence criterion.

A matrix type correction law consists of applying the calculated difference in calorimetric rendering $(\Delta C_R, \Delta C_G, \Delta C_B)$ or a function of this difference to each pixel in the images of the video stream to be corrected.

An iterative type correction law consists of applying the difference in calorimetric rendering $(\Delta C_R, \Delta C_V, \Delta C_B)$ to each pixel of images in the video stream to be corrected, and consecutively remeasuring the new difference $(\Delta C_R', \Delta C_V', \Delta C_B')$, checking that it is less than the previously measured difference, and applying this new difference to all pixels. The convergence criterion is therefore: $\Delta C_R' < \Delta C_R$, $\Delta C_V' < \Delta C_V$, $\Delta C_B' < \Delta C_B$. This processing is repeated until a difference in calorimetric rendering less than a predetermined threshold is obtained, this threshold being advantageously the perception threshold of the human eye. It the convergence criterion is not satisfied, then the iterative method is not appropriate and the matrix correction method is applied.

Obviously, these processings may be done in other systems of units, such as the YUV video units system or the system of XYZ units used for the human eye. Advantageously, it would be possible to use known transformation matrices to convert values of all components in RGB into other systems of units that are better adapted to the video system to be corrected.

Preferably, the values of differences measured on each color component is compared 25 with a corresponding predetermined threshold value, so as to be able to determine if these differences are acceptable by the correction device 6, in other words if they are not too large to be corrected by this correction device.

If these differences are incompatible with correction possibilities available in the correction device 6, the correction device will not apply any correction to the video stream output from the source 1b. If these differences remain unacceptable during several consecutive measurement periods, the system sends 29 an alert signal to indicate that manual action will be necessary on the adjustment of the display units or the video systems. The system may increment 27 a counter C for this purpose and when the value of this counter exceeds 28 a certain threshold, the system sends an alert signal. Obviously, the value of the counter C will be reset to zero if a correction is made.

This arrangement means that a difference in color between images displayed on the two screens 10a, 10b resulting from the passage of an object in front of the camera(s) will not be taken into account, and when the edge of an object is displayed between the two measurement areas 13a, 13b.

Figure 4:
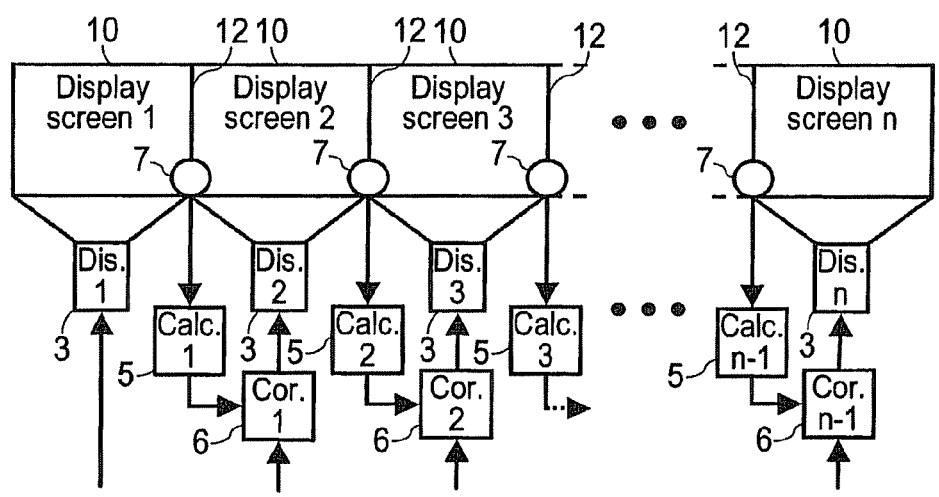
FIG. 4 shows a display screen with n display units, equipped with the system according to the invention.

The system described with reference to FIG. 1 may be generalized to n display screens, as shown in FIG. 4. In this figure, the display system comprises n display screens 10 (where n is an integer number more than 2), each screen being controlled by a corresponding display unit 3. The correction system according to the invention comprises a calorimetric measurement and correction system using the separation line 12 between two adjacent screens. Each rank i measurement and correction system (where i is an integer number between 1 and n−1) includes a sensor 7 positioned facing a separation line 12 between two adjacent screens 10 with ranks i and i+1, this sensor being coupled to a calculation device 5 calculating the rank i calorimetric drift, which is connected to a rank i correction device 6, inserted in the control video system of the rank i+1 display unit 3. Therefore this system includes n−1 calorimetric measurement and correction systems, the rank 2 to n display units 3 being adjusted one by one starting from the rank 1 screen 10.

It would be possible to store a history of differences calculated between the two measurement areas, and analyzing this history using a statistical tool 7 (FIG. 1) so as to create calorimetric drift laws as a function of the display unit types and models. These calorimetric drift laws may be used to anticipate and therefore plan operator actions to make manual adjustments.

The invention claimed is:

1. A method, comprising:
    receiving colorimetric data related to an image displayed on a separation area associated with adjacent display screens of a display surface, wherein individual of the display screens are controlled by a corresponding one of video processing systems through which a corresponding one of video streams passes, and wherein the colorimetric data comprises colorimetric measurements for individual screens of the adjacent display screens;
    sampling the colorimetric data;
    analyzing the colorimetric data obtained by the sampling to determine a difference in colorimetric rendering between the adjacent display screens; and
    generating a corrected video stream by correcting a first corresponding one of the video streams of the adjacent display screens without correcting another corresponding one of the video streams of the adjacent display screens, wherein the correcting of the first corresponding one of the video streams is based at least in part on the difference in colorimetric rendering.

2. The method of claim 1, wherein the receiving includes receiving the colorimetric data from a video camera receiving the image from the separation area.

3. The method of claim 1, wherein the sampling of the colorimetric data comprises:
    determining one or more measurement areas;
    determining average color components in the one or more measurement areas; and
    determining differences in color components based at least in part on a comparison of each average color component in one of the one or more measurement areas with a corresponding average color component in another of the one or more measurement areas.

4. The method of claim 3, wherein the determining of the average color components includes determining an average color component for a measurement area from color components of each pixel in the measurement area.

5. The method of claim 1, wherein the sampling the colorimetric data comprises sampling the colorimetric data at time intervals ranging from about two minutes to about twenty minutes.

6. The method of claim 1, wherein the correcting the first corresponding one of the video streams comprises applying a correction law to the difference in colorimetric rendering.

7. The method of claim 6, wherein the applying the correction law to the difference in colorimetric rendering comprises applying a matrix type law to the difference in colorimetric rendering.

8. The method of claim 6, wherein the applying the correction law to the difference in colorimetric rendering comprises applying an iterative type law with a convergence criterion to the difference in colorimetric rendering.

9. The method of claim 8, wherein the applying the iterative type law with the convergence criterion to the difference in colorimetric rendering further comprises:
    while a first difference between colorimetric rendering between two screen areas respectively situated in the adjacent display screens is greater than a predetermined threshold:
    applying the first difference to each pixel of images in the corrected video stream,
    determining a second difference in colorimetric rendering between the two screen areas after applying the first difference,
    comparing the second difference to the first difference, and responsive to the second difference being greater than the first difference, applying a matrix correction method to the corrected video stream.

10. The method of claim 6, wherein the applying the correction law to the difference in colorimetric rendering further comprises applying the correction law to the difference in colorimetric rendering at time intervals ranging from about two minutes to about twenty minutes.

11. The method of claim 1, wherein the correcting the first corresponding one of the video streams comprises:
    comparing the difference in colorimetric rendering with a threshold; and responsive to determining the colorimetric rendering is greater than the threshold, not correcting the corresponding one of the video streams.

12. The method of claim 11, further comprising:
responsive to determining that the difference in colorimetric rendering is greater than the threshold for at least a specified number of consecutive time periods, sending an alert signal indicating a manual adjustment of at least one of the video processing systems is desired to cause the colorimetric rendering of the display surface to be uniform.

13. The method of claim 1, further comprising:
storing a history of colorimetric differences determined for the adjacent display screens; and
performing an analysis of the history to set up a colorimetric drifts law for individual of the adjacent display screens.

14. A system comprising:
a correction system that is configured to control a display surface, comprising at least one pair of adjacent display screens, to correct colorimetric rendering of one display screen of the at least one pair of adjacent display screens, wherein an individual display screen of the at least one pair of adjacent display screens is controlled by a corresponding video processing system, of at least two video processing systems, through which a corresponding video stream, of at least two video streams, passes, wherein the at least two video streams comprise a first video stream and a second video stream, the correction system including:
a sensor that is configured to supply image data of images displayed on the at least one pair of adjacent display screens; and
a correction device configured to generate a corrected video stream of one video stream of a first video processing system of the at least two video processing systems by application of a correction law to correct the first video stream to generate the corrected video stream without correction of the second video stream of a second video processing system of the at least two video processing systems, the correction law based at least in part on a difference in colorimetric rendering between adjacent display screens of the at least one pair of adjacent display screens, wherein the correction device is configured to apply the correction law at least in part by determination of a result of a function of the difference in colorimetric rendering, and application of the result of the function to at least a portion of pixels of images in the corrected video stream.

15. The system of claim 14, wherein the sensor is a video camera placed overlapping a separation area between the at least one pair of adjacent display screens.

16. The system of claim 14, wherein the sensor is configured to sample image data at time intervals ranging from approximately two minutes to approximately twenty minutes.

17. The system of claim 14, wherein the correction device is configured to apply the correction law at time intervals ranging from approximately two minutes to approximately twenty minutes.

18. The system of claim 14, wherein, to facilitate the determination of the function of the difference in colorimetric rendering the correction device is further configured to determine a first difference between colorimetric rendering between two screen areas respectively situated in the at least one pair of adjacent display screens.

19. The system of claim 18, wherein, to facilitate the application of the result of the function, the correction device is further configured to:
apply the first difference to each pixel of images in the corrected video stream,
determine a second difference in colorimetric rendering between the two screen areas after applying the first difference,
compare the second difference to the first difference, and
responsive to the second difference being greater than the first difference, apply a matrix correction technique to the one of the at least two video processing systems to generate the corrected video stream.

20. The system of claim 14, wherein the difference in colorimetric rendering is based at least in part on image data periodically sampled by the sensor.

21. A system, comprising:
means for calculating a difference in colorimetric rendering between adjacent display screens of a display surface based at least in part on an analysis of sampled colorimetric data relating to an image displayed on a separation area associated with the adjacent display screens, wherein individual of the adjacent display screens are controlled by a corresponding one of video processing systems through which a corresponding one of video streams passes, and wherein the colorimetric data comprises colorimetric measurements for individual display screens of the adjacent display screens; and
means for generating a corrected video stream by correcting a first corresponding one of the video streams of the adjacent display screens without correcting a second corresponding one of the video streams of the adjacent display screens, wherein the correcting of the first corresponding one of the video streams is based at least in part on the difference in colorimetric rendering.

22. The system of claim 21, further comprising:
means for sampling the colorimetric data; and
means for analyzing the colorimetric data obtained by the means for sampling to facilitate determining the difference in colorimetric rendering between the adjacent display screens.

23. The system of claim 21, wherein the means for sampling the colorimetric data further determines one or more measurement areas, determines average color components in each of the one or more measurement areas, and determines differences in color components based at least in part on a comparison of each average color component in one of the one or more measurement areas with a corresponding average color component in another of the one or more measurement areas.

24. The system of claim 21, wherein the means for generating the corrected video stream further comprises applying a correction law to the difference in colorimetric rendering to facilitate correcting the first corresponding one of the video streams.

25. The system of claim 21, the means for generating the corrected video stream applies an iterative type law with a convergence criterion to the difference in colorimetric rendering.

26. The system of claim 25, wherein, while a first difference between the colorimetric rendering between two screen areas respectively situated in the adjacent display screens is greater than a predetermined threshold, the means for generating the corrected video stream applies the iterative type law with a convergence criterion to the first difference in the colorimetric rendering and includes:

means for applying the first difference to each pixel of images in the corrected video stream, means for determining a second difference in the colorimetric rendering between the two screen areas after applying the first difference, means for comparing the second difference to the first difference, and responsive to the second difference being greater than the first difference, means for applying a matrix correction method to the first corresponding one of the video streams to generate the corrected video stream.

27. A correction device comprising:

a correction component configured to:

receive colorimetric data related to an image displayed on a separation area associated with adjacent display screens of a display surface, wherein an individual display screen of the adjacent display screens is controlled by a corresponding video processing system, of at least two video processing systems, through which a corresponding video stream, of at least two video streams, passes, wherein the at least two video streams comprise a first video stream and a second video stream, generate a corrected video stream for the first video stream of a first video processing system of at least two video processing systems associated with the correction component by application of a correction law to correct the first video stream, based at least in part on a difference in colorimetric rendering, without correction of the second video stream of a second video processing system of the at least two video processing systems, and apply the correction law at least in part by determination of a result of a function of the difference in colorimetric rendering between the adjacent display screens based at least in part on the colorimetric data, and application of the result of the function to at least a portion of pixels of images in the corrected video stream.

* * * * *

UNITED STATES PATENT AND TRADEMARK OFFICE
CERTIFICATE OF CORRECTION

PATENT NO. : 7,940,329 B2  
APPLICATION NO. : 12/365432  
DATED : May 10, 2011  
INVENTOR(S) : Houmeau et al.

Page 1 of 1

It is certified that error appears in the above-identified patent and that said Letters Patent is hereby corrected as shown below:

Title page, item (76), under "Inventors", in Column 1, Line 1, delete "Francoise Houmeau," and insert -- Francois Houmeau, --.

Title page, item (57), under "Abstract", in Column 2, Line 8, delete "calorimetric" and insert -- colorimetric --.

Title page, item (57), under "Abstract", in Column 2, Line 14, delete "calorimetric" and insert -- colorimetric --.

Signed and Sealed this  
Sixteenth Day of August, 2011

David J. Kappos  
*Director of the United States Patent and Trademark Office*